United States Patent [19]
Morita et al.

[11] Patent Number: 5,741,887
[45] Date of Patent: Apr. 21, 1998

[54] AGENTS AND METHODS FOR GENERATION OF ACTIVE OXYGEN

[75] Inventors: Ken-ichi Morita, 3-12-5 Kataseyama, Fujisawa, Kanagawa; Shigeru Otsuka, Saitama; Kiyoshi Saito, Chiba, all of Japan

[73] Assignee: Ken-ichi Morita, Kanagawa, Japan

[21] Appl. No.: 700,592

[22] Filed: Aug. 14, 1996

[30] Foreign Application Priority Data

Dec. 26, 1995 [JP] Japan .................................. 7-338347

[51] Int. Cl.$^6$ .................................................. C08G 73/00
[52] U.S. Cl. .......................... 528/422; 128/480; 128/485; 128/489; 212/500; 212/509; 212/511
[58] Field of Search .................. 528/422, 480, 528/485, 489; 252/500, 508, 511, 509

[56] References Cited

FOREIGN PATENT DOCUMENTS

| 6-036677 | 2/1994 | Japan . |
|---|---|---|
| WO94/005016 | 3/1994 | WIPO . |
| WO95/028716 | 10/1995 | WIPO . |

OTHER PUBLICATIONS

L. Doubova, et al. "Polyaniline as a Cathode For O2 Reduction –Kinetics of the Reaction with H2O2 and Use of the Polymer in a Model H2O2 Fuel Cell", Electrochimica Acta vol. 34, 331–343.
R.J. Jiang, et al., "Catalysis of Dioxygen Reduction at Soluble Polyaniline Modified Electrode", Chinese Journal of Chemistry, vol. 9, No. 2, 1991, (p. 117, paragraph 3–p. 118, paragraph 1).
S. Otsuka, et al., "Generation of Superoxide by Adding Aniline to Water", Chemistry Letters, No. 8, 1996, Tokyo, Japan, pp. 615–616.
G. Mengoli et al., "Potentiometric Investigation of the Kinetics of the Polyaniline–Oxygen Reaction", Journal of the Electroanalytical Chemistry, vol. 202, 1986, Netherlands, pp. 217–230.

*Primary Examiner*—Duc Truong
*Attorney, Agent, or Firm*—Keiichi Nishimura

[57] ABSTRACT

Agents containing polyaniline of one or more specified kinds shown by Formulas (1)–(4) given below can generate active oxygen efficiently and economically when contacted with a liquid having oxygen dissolved therein:

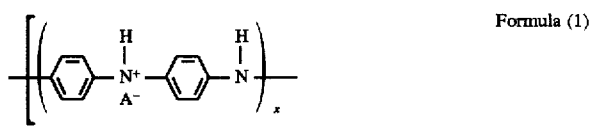

Formula (1)

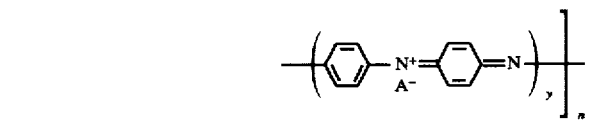

Formula (2)

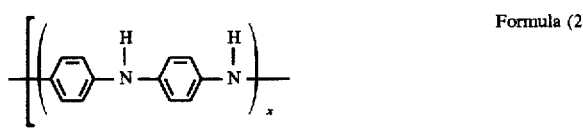

Formula (3)

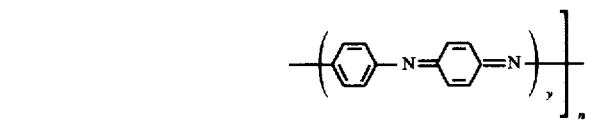

Formula (4)

where A is a negative ion, n is an integer between 2 and 5000, x and y are numbers such that $x+y=1$ and $0 \leq y \leq 0.5$.

12 Claims, 3 Drawing Sheets

Pernigraniline salt (CA) — Doped Polyaniline (Emeraldine salt) (AA) — Leucoemeraldine salt (BA)

alkali ↕ acid

Fully oxidized Polyaniline (Pernigraniline base) (CB) — Undoped Polyaniline (Emeraldine base) (AB) — Reduced Polyaniline (Leucoemeraldine base) (BB)

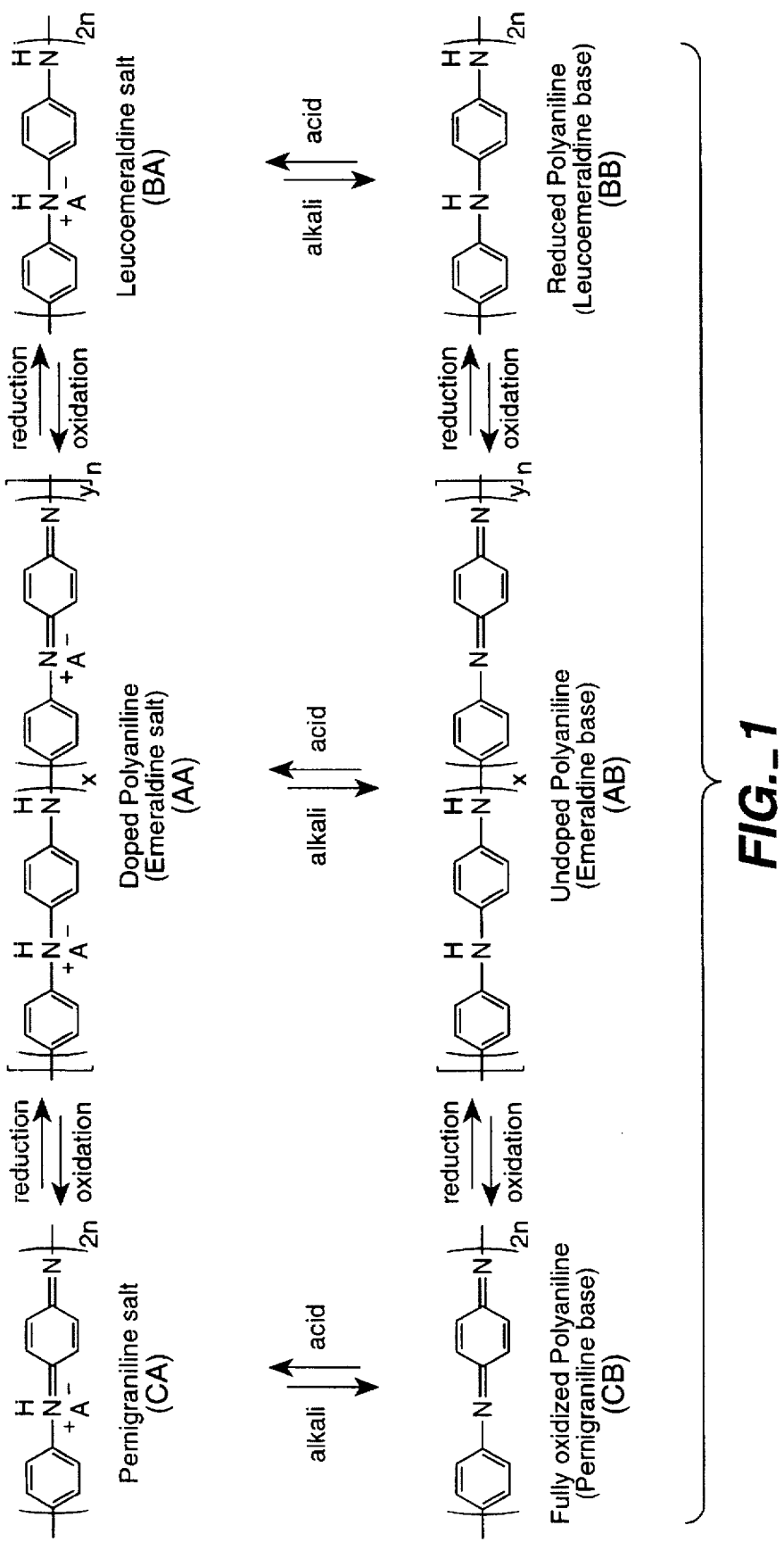
FIG._1

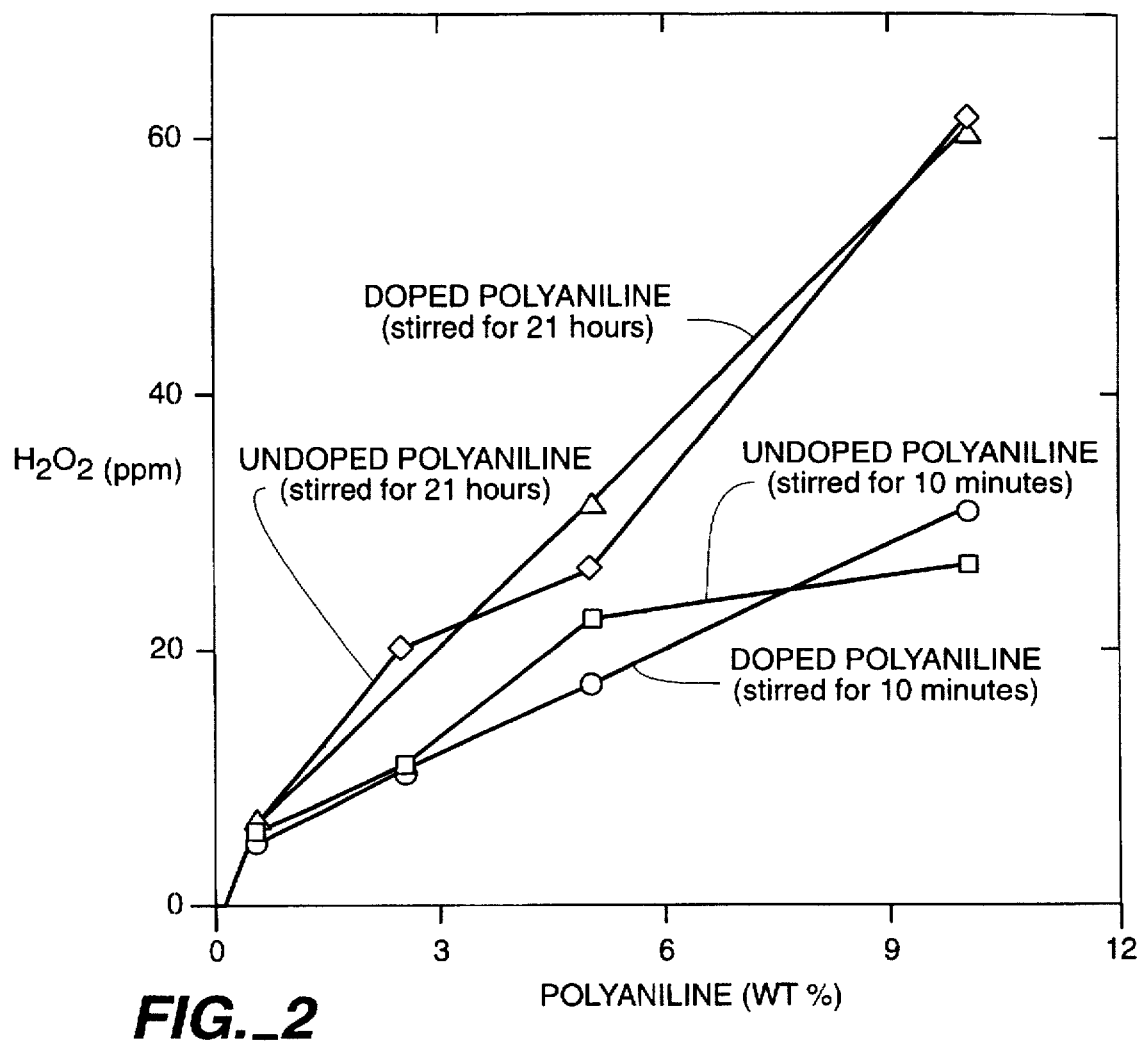
FIG._2
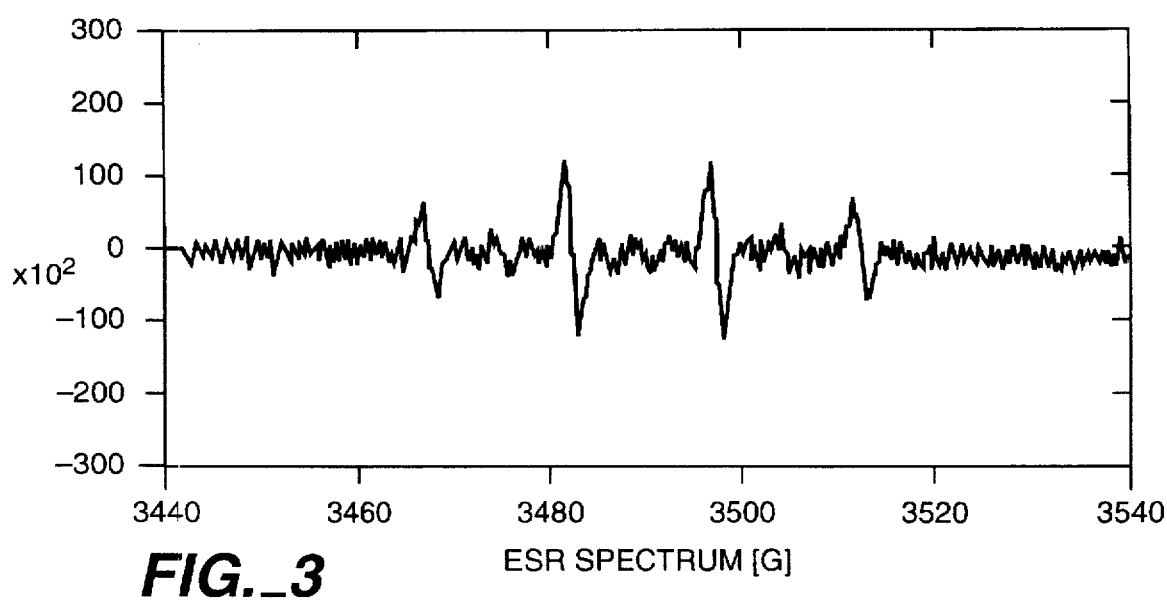
FIG._3

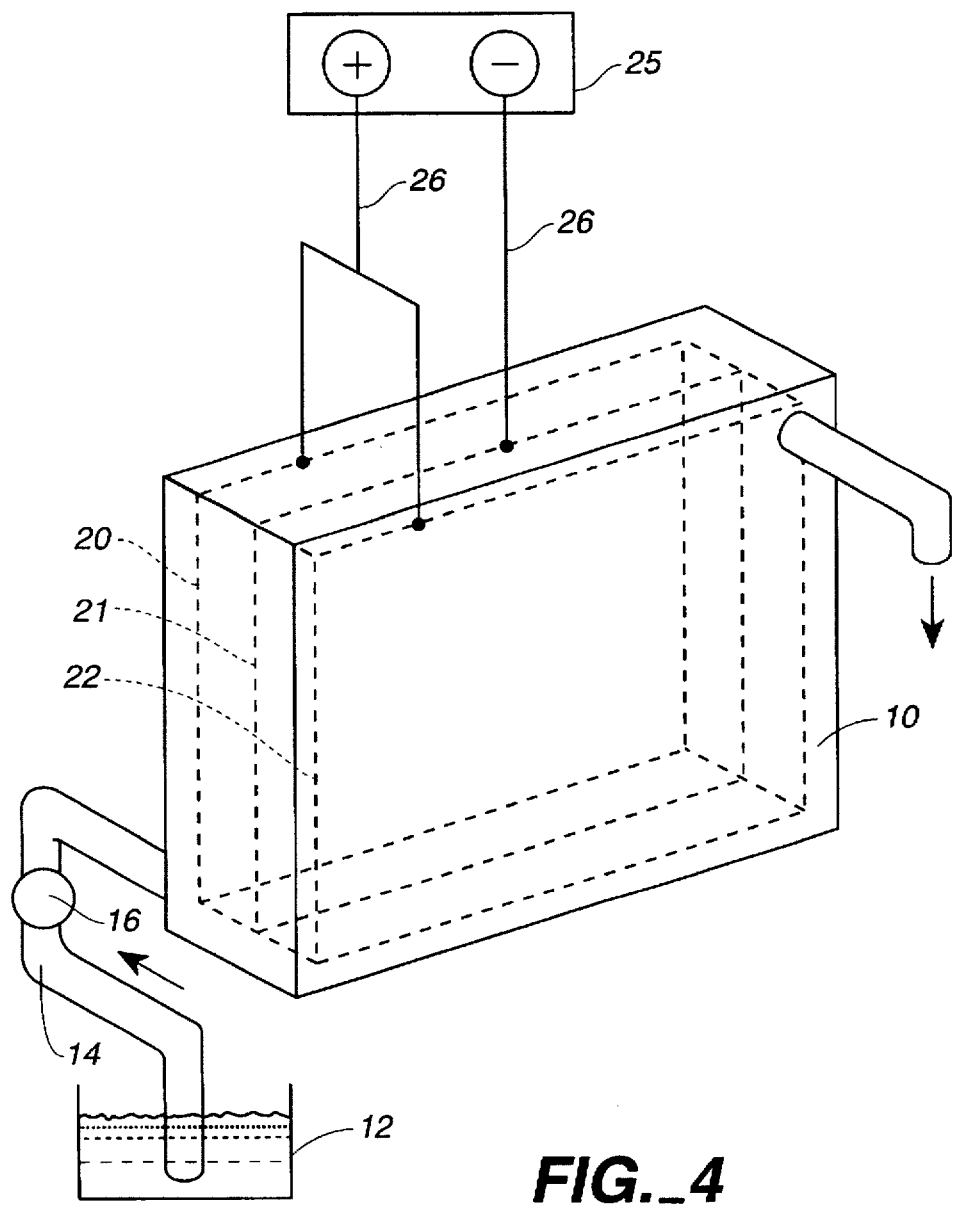
*FIG._4*

AGENTS AND METHODS FOR GENERATION OF ACTIVE OXYGEN

BACKGROUND OF THE INVENTION

This invention relates to agents capable of generating active oxygen and methods of generating active oxygen by using such agents.

Known methods of sterilizing water by killing bacteria growing therein include ultraviolet irradiation, use of chemicals, sterilization by electrolysis and generation of active oxygen in the water. Of these, methods by the generation of active oxygen are becoming popular both because no special equipment is required such as apparatus for ultraviolet generator and because of high sterilization effect.

One of known methods of generating active oxygen has been through decomposition of hydrogen peroxide by using a chemical such as a catalyst. It has also been known to generate superoxide, which is a kind of active oxygen, by adding chlorophyl to an aqueous solution and exposing it to light.

These prior art methods of generating active oxygen, however, involve problems of environmental pollution and are disadvantageous also from the point of view of cost. Methods by the use of a chemical have the problem that they are troublesome to carry out.

SUMMARY OF THE INVENTION

It is therefore an object of this invention, in view of the above, to provide new agents capable of easily generating active oxygen without causing environmental pollution and at a low cost.

It is another object of this invention to provide methods of generating active oxygen by using such agents.

Agents for generating active oxygen embodying this invention, with which the above and other objects can be accomplished, may be characterized as containing polyaniline. In other words, the present invention is based on the discovery by the present inventors that polyaniline is capable of activating oxygen dissolved in a liquid to generate active oxygen. Thus, the agent according to this invention may consist only of such polyaniline.

Throughout herein, "active oxygen" will mean all kinds of oxygen that are far more active than ordinary oxygen and can more easily start a chemical reaction, including singlet oxygen, superoxide anion radical ($.O_2^-$), hydroxy radical (.OH) and perhydroxy radical (.OOH).

Methods of generating active oxygen according to this invention are characterized as contacting a liquid having oxygen dissolved therein with an agent according to this invention for generating active oxygen.

BRIEF DESCRIPTION OF THE DRAWINGS

The accompanying drawings, which are incorporated in and form a part of this specification, illustrate embodiments of the invention and, together with the description, serve to explain the principles of the invention. In the drawings:

FIG. 1 is a drawing which shows oxidation and reduction of polyaniline;

FIG. 2 is a graph showing the relationship of the amount of polyaniline and time of stirring with the amount of generated hydrogen peroxide;

FIG. 3 is a graph showing the result of measurement of ESR spectrum; and

FIG. 4 is a schematic drawing of an apparatus for using an electrolytic method of this invention for generating active oxygen.

DETAILED DESCRIPTION OF THE INVENTION

From the point of view of efficiency in the generation of active oxygen, an agent according to this invention is characterized as containing one or more kinds of polyaniline shown by Formulas (1)–(4) given below:

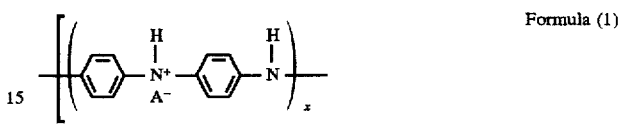

Formula (1)

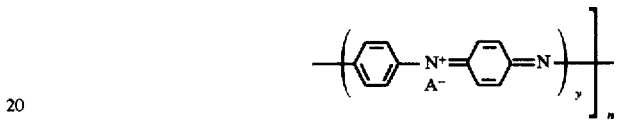

Formula (2)

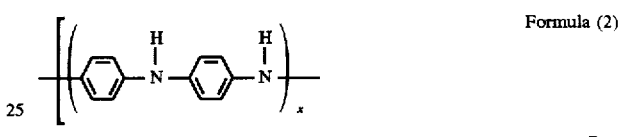

Formula (3)

Formula (4)

where A represents a negative ion, x and y are numbers such that $x+y=1$ and $0 \leq y \leq 0.5$, and n is a positive integer in a range to be described below.

Polyaniline to be used according to this invention may be either in oxidized or reduced form. It may have a substitution group such as alkyl group on the aromatic ring, or may be a copolymer. It may be either doped with protonic acid such as sulfuric acid and hydrochloric acid or with Lewis acids, or it may be undoped. There is no limitation as to the degree of polymerization.

Polyaniline according to this invention can be produced by known conventional methods such as chemical synthesis by using an oxidizing agent or an electrochemical method of synthesis. In such chemical synthesis, known oxidizing agents such as persulfates and Lewis acid may be used.

Preferred examples of polyaniline according to this invention will be explained more in detail next with reference to FIG. 1.

Doped polyaniline (AA) is produced by an ordinary method of chemical synthesis whereby aniline is dissolved in an aqueous acid solution and an oxidizing agent is added thereto for effecting polymerization. Undoped polyaniline (AB) is obtained if this is neutralized with an alkali. These two types of polyaniline AA and AB may be referred to as oxidized polyaniline, in order to distinguish them from reduced polyaniline which will be described below. Aforementioned AB is also referred to as emeraldine, and AA is its salt. These oxidized kinds of polyaniline AA and AB can be reduced easily electrochemically or by the use of a weak reducing agent such as hydrazine, becoming BA or BB as shown in FIG. 1, BB being also referred to as leucoemeraldine and BA being its salt. Normally, polyanilines are said to contain about 50% each of the oxidized form and reduced form. Polyanilines in the reduced form are automatically oxidized, if left in air, becoming polyaniline (AA, AB). Polyanilines do not undergo any change, even if left in air. If they are further oxidized by stronger oxidizing agent, however, pernigraniline (CB) or its salt (CA) is generated. They have shown no activity. In FIG. 1, the number of repetition n is generally 2–5000, and more preferably 10–1000.

The agents according to this invention for the generation of active oxygen may preferably include an additive, in addition to polyaniline of the types described above. One of the purposes of using an additive is to make polyaniline easier to handle in a solid form. When a small amount of polyaniline powder is thrown into water, it will tend to float and its ability to generate peroxides may not be effectively utilized. Secondly, an additive can allow polyaniline to spread over the surface of a solid body to thereby enlarge the surface contact area, and it is preferable because active oxygen can be generated only if polyaniline comes into contact with water. Thirdly, an additive can improve adhesion when polyaniline of this invention is made into pellets. Thus, additives to be used according to this invention are selected preferably such that the above and other purposes therefor are satisfied.

Examples of such additive include active carbon, zeolite, carbon powder, conductive fibers, carbon fibers, various polymer materials and inorganic materials such as diatomite, alumina and soil. The content of such an additive with respect to polyaniline is preferably 0.01% or greater.

The invention does not place any limitation as to the form in which the agent is to be used. The agent may be in the form of powder, film or pellets. Polyaniline according to this invention may also be attached like a thin film over the surfaces of conductive fibers such as carbon fibers and other solid materials.

Next, the method of generating active oxygen is explained. The method according to this invention is characterized by the step of causing contact between a liquid with oxygen dissolved therein and an agent of the aforementioned types for the generation of active oxygen.

The liquid to be used according to this invention is generally one to be sterilized. It is usually water, and it may be water of any kind as long as oxygen is dissolved therein, such as tap water, well water, spring water and pure water. Examples may further include those containing an electrolyte or other soluble substances such as saline and buffer solutions. Examples of liquid other than water include dimethyl sulfoxide, dimethyl formamide, acetonitrile and pyridine. Oxygen in air is usually dissolved in such liquid at a rate of about 5–500 ppm.

The invention does not place any particular limitation on the method of causing such liquid to come into contact with an agent according to this invention. For example, an agent according to this invention in the form of powder or pellets may be thrown into the target liquid and stirred. Alternatively, a carrier member of a porous material may be caused to hold an agent according to this invention and the target liquid is passed therethrough such that active oxygen can be generated in a continuous manner. Still another method is to cause a metallic member, an electrically conductive material or a felt-like material to hold an agent of the present invention and to pass the target liquid therethrough while a reducing voltage is inputted thereon so as to continuously generate active oxygen.

One of the methods for increasing the generation of active oxygen is to supply air or a gas with a large oxygen content into the liquid. Another method is to repeat the contact with polyaniline. Still another method is to make the contact while reducing polyaniline of oxidized form. When the reduction of polyaniline is carried out by electrochemical method, it is more effective to use doped polyaniline because doped polyaniline is more electronically conductive than undoped polyaniline. Many methods to improve conductivity of polyaniline can be utilized for this invention. Agents according to this invention are economically advantageous because their function to generate active oxygen is revived easily.

FIG. 4 shows schematically an apparatus embodying this invention for generating active oxygen electrolytically. A box-shaped plastic container (cell) 10 of dimensions 120× 70×8 mm with inner capacity 23 ml, serving as an electrolytic cell, contains therein three planar electrodes 20, 21, 22 parallel to one another, each comprising a titanium plate with dimensions 100×60×0.5 mm and having indentations of about 3 μm on the surfaces which are plated with platinum. The container 10 is provided with a liquid inlet and an outlet, and the liquid inlet is connected to a source of saline water (0.9% aqueous solution of NaCl) 12 through a plastic tube 14 containing a pump 16. The one (21) at the center of the three platinum-plated titanium plates 20, 21, 22 is adapted to serve as the cathode, having thin polyaniline layers formed on both surfaces thereof by a known electrolytic method of polymerization (polymerization coulomb number=3.2 coulomb). The outer ones (20, 22) of these three plates 20, 21, 22 are adapted to serve as anodes, as shown schematically in FIG. 4 by way of a galvanostat 25 and lead lines 26 connecting the plate electrodes 20, 21, 22 therewith. As a test, the saline water from the source 12 was caused to flow through the container 10 at flow rate of 30 ml/minute and a current of −0.3 mA (at current density of −2.5 μA/cm$^2$) was supplied to the electrode 21. The content of hydrogen peroxide in the liquid flowing out of the container 10 was 5 ppm. The amount of active oxygen which was generated in the water was measured in terms of the amount of produced hydrogen peroxide on the principle that hydrogen peroxide is generated from active oxygen (exclusive of hydrogen peroxide) by a disproportionation reaction. The surface tension of the saline water was 70.6 dyne/cm before entering the cell 10 and 54.2 dyne/cm after leaving the cell 10. Similar results were obtained by another test carried out by using as the cathode a carbon fiber cloth with polyaniline membranes. Diaphragms of an ordinary type may be inserted between the electrodes.

The mechanism for the generation of active oxygen in such a liquid may be as follows. When an oxygen-containing liquid comes into contact with an agent according to this invention, the oxygen in the liquid receives an electron from the polyaniline in the agent and becomes superoxide ($.O_2^-$). This means that the polyaniline loses one electron and that there is an increase in the oxidized structure. It is not clear by what mechanism the activity of the agent is revived when it is filtered and then dried, but it seems that the polyamine with increased oxidized structures somehow changes back to the polyaniline of the earlier structure. Since polyanilines with increased oxidized structures can be easily reduced by an electrochemical method and by using reducing agents such as hydrazine, they can be also converted into polyaniline with the original structure or polyaniline of the reduced form.

EXAMPLES

The invention will be explained next with reference to experiments which have been performed.

Synthesis No. 1

A 1N aqueous solution of hydrochloric acid 800 ml containing ammonium peroxydisulfate 83.4 g, cooled to 1° C., was added to a 1N aqueous solution of hydrochloric acid 1200 ml containing aniline 74.4 g, cooled likewise to 1° C., over a period of over 1 minute with stirring in an atmosphere of nitrogen, and the reaction was further continued with stirring at 5° C. for 90 minutes. After the reaction, the precipitate was filtered and washed with 1N hydrochloric acid to obtain polyaniline with doping rate 42%. In this series of processes, sulfuric acid can be substituted for hydrochloric acid.

Next, the polyaniline thus obtained was suspended in 1 weight % aqueous solution of sodium carbonate. The precipitate was filtered after the stirring was continued for 15 hours while its pH was maintained above 8, and it was washed with 1 weight % aqueous solution of sodium carbonate and dried to obtain polyaniline (in powder form) with doping rate 0%. This corresponds to what is shown as AB in FIG. 1.

Synthesis No. 2

After polyaniline with doping rate 42% was obtained as explained above for Synthesis No. 1, it was further suspended in 1N aqueous solution of hydrochloric acid. After it was stirred for 15 hours, it was washed with 1N aqueous solution of hydrochloric acid and dried under a condition of reduced pressure to obtain polyaniline (in powder form) with doping rate 100%. This corresponds to what is shown as AA in FIG. 1.

Synthesis No. 3

After polyaniline with doping rate 0% was obtained as explained above for Synthesis No. 1, it was suspended in 20 volume % methanol solution of hydrazine dihydrate and stirred for 3 hours. After the precipitate in this solution was filtered and washed, it was further dried under a condition of reduced pressure to obtain polyaniline in reduced form (in powder form). This corresponds to what is shown as BB in FIG. 1.

Synthesis No. 4

A platinum plate was used as the working electrode, a stainless steel plate as opposite electrode and a standard calomel electrode as reference electrode with an aqueous solution containing aniline 0.1M, sulfuric acid 0.5M, sodium sulfate 0.2M and pyridine 0.3M, and 0.7 V vs SCE was applied to the working electrode for 40 minutes. As a result, a green film of polyaniline was formed on the platinum plate. After this film was thoroughly washed with water, it was soaked in an aqueous solution containing sulfuric acid 0.5M and sodium sulfate 0.2M, and 0 V vs SCE was applied. As a result, a light yellow film of polyaniline in reduced form was generated. This corresponds to what is shown as BA in FIG. 1.

Example No. 1

Both doped polyaniline (AA) and undoped polyaniline (AB) were used as example of polyaniline, and different amounts of them were added to water (ion exchange water) and stirred at 25° C. for either 10 minutes or 21 hours. The amount of active oxygen which was generated in the water was measured in terms of the amount of produced hydrogen peroxide on the principle that hydrogen peroxide is generated from active oxygen (exclusive of hydrogen peroxide) by a disproportionation reaction. Quantitative analyses of hydrogen peroxide were carried out by an electrochemical method. More in detail, two microhole electrodes were used simultaneously for measurement (as described by K. Morita and Y. Shimizu in Anal. Chem., 61, 159 (1989)), and the average of the absolute values of the reduction current to water at −0.6 V and the oxidation current to oxygen at +0.9 V was used in the case of measurement at constant voltage.

The results of these measurements are shown in FIG. 2 wherein the horizontal axis represents the weight % of polyaniline with respect to water and the vertical axis represents the concentration (ppm) of the generated hydrogen peroxide. FIG. 2 shows that the amount of hydrogen peroxide which is generated increases as the amount of added polyaniline is increased. It is also seen that the amount of generated hydrogen peroxide increases if the time of stirring is increased. No difference was observed, however, between doped and undoped types.

The presence of active oxygen (exclusive of hydrogen peroxide) in these measurements was actually ascertained by using 5,5-dimethyl-1-pyrroline-N-oxide (DMPO), which is a spin-trap agent, in order to stabilize the unstable active oxygen. Explained more in detail, 0.09M DMPO was added to refined water, and polyaniline powder sample 0.0225 g was added to 1.5 ml of this aqueous solution and stirred for about 10 minutes. Electron spin resonance (ESR) spectrum was measured by using an aqueous solution obtained by filtering it.

The result of this measurement is presented in FIG. 3, showing the spectrum of hydroxy radical (.OH) adduct. Hydroxy radical adduct is known to be produced through an adduct of a superoxide.

Generation of superoxide was also confirmed by the electrochemical method according to K. Tanaka, F. Kobayashi, Y. Isogai and T. Iizuka (as disclosed in Bioelectrochemistry and Bioenegetics, 26, 413 (1991)). A microhole array electrode (K. Morita and Y. Shimizu, ibid.) with depth of 50 μm and total electrode area of $3.62 \times 10^{-4}$ cm$^2$ serving as a working electrode, platinum wire serving as a counter electrode and Ag/AgCl serving as a reference electrode were set in a cell containing 1 weight % undoped polyaniline (AB in FIG. 1) in a stirred phosphate buffer solution. The working electrode was poised at 0.1 V vs Ag/AgCl at room temperature. About 100 pA of oxidation current of superoxide was observed. When 1 weight % of the reduced form of polyaniline (BB in FIG. 1) was used instead of polyaniline (AB), a current greater than 1000 pA was observed.

In another experiment, 0.1 g of polyaniline (AB in FIG. 1) coated on carbon fibers was added to 100 ml of pure water with surface tension 72 dyne/cm and the solution was stirred for 15 minutes. The surface tension of the solution thus obtained was 51 dyne/cm. It is believed because the superoxide thus generated cuts down large clusters of water molecules into smaller ones.

No bacillus was found after 0.1 g of polyaniline (AB in FIG. 1) was added to 100 ml of an aqueous solution which contained bacilli and the mixture was stirred for 15 minutes.

Example No. 2

After polyaniline in reduced form (BB in FIG. 1) 0.1 g was added to ion exchange water 10 ml and stirred for 24 hours, the amount of generated hydrogen peroxide was measured as in Example No. 1. The measured concentration of hydrogen peroxide was 32 ppm. Next, the amount of generated hydrogen peroxide was measured as in Example No. 1 except use was made of polyaniline in oxidized form (AB in FIG. 1) obtained in aforementioned Synthesis No. 1. The concentration of hydrogen peroxide was 10 ppm.

Example No. 3

Example No. 1 was repeated except the experiment was carried out while pure oxygen was blown into the water. The amount of generated hydrogen peroxide was about 5 times as much as in Example No. 1.

Example No. 4

The amount of generated hydrogen peroxide was measured as in Example No. 1 except a phosphoric acid buffer solution (containing sodium phosphate) with pH 7 and a potassium sulfate solution (containing 0.4M $K_2SO_4$) were used instead of ion exchange water. The result was about the same as in Example No. 1.

Example No. 5

The amount of generated hydrogen peroxide was measured as in Example No. 1 except use was made of polyaniline in reduced form (BA in FIG. 1). At each point of measurement, more hydrogen peroxide was generated than in Example No. 1.

As shown above, the agents according to this invention are capable of generating active hydrogen easily merely by contacting a liquid having oxygen dissolved therein, without requiring any particular equipment of process. They are further characterized wherein their activity is revived after they are used if they are filtered and dried, such that they can be used over again, and there is no problem of environmental pollution. For these reasons, the agents according to this invention can overcome the problems of environmental pollution, costs and troubles of handling associated with prior art agents.

What is claimed is:

1. A method of generating active oxygen, said method comprising the step of causing a liquid having oxygen dissolved therein to contact an agent comprising polyaniline which is one or more selected from the group consisting of compounds shown by Formulas (1)–(4) given below:

Formula (1)

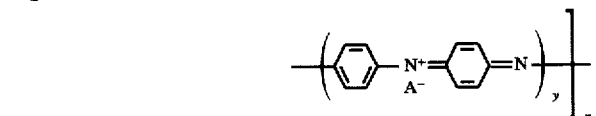

Formula (2)

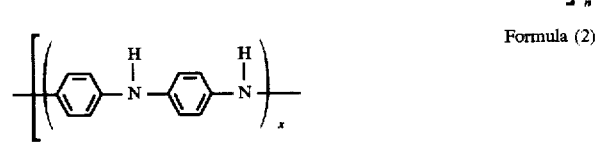

Formula (3)

Formula (4)

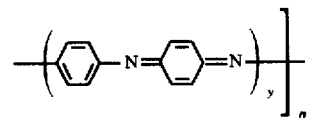

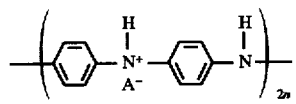

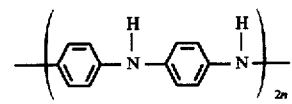

where A is a negative ion, n is an integer between 2 and 5000, and x and y are numbers such that $x+y=1$ and $0 \leq y \leq 0.5$.

2. The method of claim 1 wherein said liquid has oxygen dissolved herein at a rate of 5–500 ppm.

3. The method of claim 2 wherein said agent contains said polyaniline by 1–100 weight %.

4. The method of claim 2 wherein said agent contains said polyaniline by 10–70 weight %.

5. The method of claim 1 wherein said agent further comprises an additive, said additive being at least 0.01% of said polyaniline and capable of improving contact of said polyaniline with said liquid.

6. The method of claim 5 wherein said additive is selected from the group consisting of active carbon, zeolite, carbon powder, conductive fibers, carbon fibers, polymer materials, diatomite, alumina and soil.

7. A method of generating active oxygen, said method comprising the steps of causing a liquid having oxygen dissolved therein to contact an agent comprising polyaniline and carrying out electrolysis in said liquid with a cathode having a surface covered with a membrane comprising said agent, thereby causing oxygen in said liquid to receive an electron from the polyaniline in said agent to become superoxide.

8. The method of claim 1 further comprising the step of carrying out electrolysis in said liquid with a cathode having a surface covered with a membrane comprising said agent, thereby causing oxygen in said liquid to receive an electron from the polyaniline in said agent to become superoxide.

9. A method of generating active oxygen, said method comprising the steps of causing a liquid having oxygen dissolved therein to contact an agent comprising polyaniline and filtering, drying and reusing said agent.

10. The method of claim 1 wherein active oxygen is generated from said liquid contacting said agent.

11. The method of claim 7 wherein active oxygen is generated from said liquid contacting said agent.

12. The method of claim 9 wherein active oxygen is generated from said liquid contacting said agent.

* * * * *